(12) United States Patent
Suzuki et al.

(10) Patent No.: US 11,712,949 B2
(45) Date of Patent: Aug. 1, 2023

(54) AUTOMOBILE SIDE STRUCTURE AND AUTOMOBILE

(71) Applicant: NIPPON STEEL CORPORATION, Tokyo (JP)

(72) Inventors: Toshiya Suzuki, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 157 days.

(21) Appl. No.: 17/422,310

(22) PCT Filed: Jan. 15, 2020

(86) PCT No.: PCT/JP2020/001091
§ 371 (c)(1),
(2) Date: Jul. 12, 2021

(87) PCT Pub. No.: WO2020/149308
PCT Pub. Date: Jul. 23, 2020

(65) Prior Publication Data
US 2022/0089005 A1    Mar. 24, 2022

(30) Foreign Application Priority Data
Jan. 15, 2019 (JP) .................................. 2019-004034

(51) Int. Cl.
*B60J 5/04*    (2006.01)

(52) U.S. Cl.
CPC .................................. *B60J 5/0458* (2013.01)

(58) Field of Classification Search
CPC ....... B60J 5/0427; B60J 5/0458; B60J 5/0423
See application file for complete search history.

(56) References Cited

U.S. PATENT DOCUMENTS

| | | | |
|---|---|---|---|
| 4,307,911 A * | 12/1981 | Pavlik | B62D 25/025 296/187.12 |
| 7,837,255 B1 * | 11/2010 | Okutsu | B60J 5/0425 296/187.12 |
| 2004/0090087 A1 * | 5/2004 | Kimura | B60J 7/022 296/203.03 |
| 2018/0141416 A1 | 5/2018 | Nagaishi et al. | |
| 2019/0168588 A1 | 6/2019 | Suzuki et al. | |

FOREIGN PATENT DOCUMENTS

| | | |
|---|---|---|
| JP | 2003-205741 A | 7/2003 |
| JP | 2004-224097 A | 8/2004 |
| WO | WO 2016/189700 A1 | 12/2016 |
| WO | WO 2018/021421 A1 | 2/2018 |

* cited by examiner

*Primary Examiner* — Joseph D. Pape
(74) *Attorney, Agent, or Firm* — Birch, Stewart, Kolasch & Birch, LLP

(57) ABSTRACT

What is provided is an automobile side structure including: a first impact absorbing member (122) extending in a vehicle height direction inside an automobile door; a second impact absorbing member (126) inside the automobile door; a door inner panel (200) inside the automobile door; and a side sill (520), in which the first impact absorbing member (122), the second impact absorbing member (126), the door inner panel (200), and the side sill (520) are on a straight line in a vehicle width direction, and the second impact absorbing member (126) is disposed between the first impact absorbing member (122) and the door inner panel (200); and an automobile.

15 Claims, 10 Drawing Sheets

AUTOMOBILE SIDE STRUCTURE AND AUTOMOBILE

TECHNICAL FIELD OF THE INVENTION

The present invention relates to an automobile side structure and an automobile.

This application claims the right of priority based on Japanese Patent Application No. 2019-004034 filed with the Japan Patent Office on Jan. 15, 2019, the content of which is incorporated herein by reference.

RELATED ART

As the related art, for example, Patent Document 1 described below discloses a technique assumed to provide a door structure for an automobile, in which it is possible to achieve vibration suppression with a high level and panel stiffness improvement of a door outer panel while suppressing a weight increase and a cost increase.

PRIOR ART DOCUMENT

Patent Document

[Patent Document 1] Japanese Unexamined Patent Application, First Publication No. 2003-205741

DISCLOSURE OF THE INVENTION

Problems to be Solved by the Invention

In the technique disclosed in Patent Document 1 above, one strut extending in a vehicle height direction of the door and a door outer waist reinforcement and a guard bar extending in a vehicle length direction of the door are provided. Of these, the strut extending in the vehicle height direction of the door is provided to improve the panel stiffness of the panel, and the guard bar extending in the vehicle length direction is responsible for absorbing an impact due to a collision.

However, an impact absorbing member such as the guard bar is installed so as to traverse the door. The end portions of the impact absorbing member are fixed, and the impact absorbing member absorbs an impact by being bent. However, the inventors of the present invention have found that if the fixing of the end portion of the impact absorbing member is easily broken, there is a problem that the performance of the impact absorbing member may not be able to be fully exhibited.

Further, the inventors of the present invention have found that since the strut provided by only one is provided to improve the panel stiffness, it is not possible to absorb an impact around the strut. Further, the inventors of the present invention have found that in order to absorb an impact, it is necessary to provide a strong guard bar, which causes a problem of increasing the weight of the door.

The present invention has been made in view of the above problems, and an object of the present invention is to provide a new and improved automobile side structure and an automobile, in which impact absorbing performance is high.

Means for Solving the Problem (1) According to an aspect of the present invention, there is provided an automobile side structure including: a first impact absorbing member extending in a vehicle height direction inside an automobile door; a second impact absorbing member inside the automobile door; a door inner panel inside the automobile door; and a side sill, in which the first impact absorbing member, the second impact absorbing member, the door inner panel, and the side sill are on a straight line in a vehicle width direction, and the second impact absorbing member is disposed between the first impact absorbing member and the door inner panel.

(2) In the automobile side structure according to the above (1), a cross section of the first impact absorbing member on the straight line may be rectangular or annular.

(3) In the automobile side structure according to the above (1) or (2), the second impact absorbing member may be joined to the door inner panel, and the second impact absorbing member and the door inner panel may form a pipe shape having an axis in the vehicle width direction.

(4) In the automobile side structure according to the above (1) or (2), the second impact absorbing member may be a part of the door inner panel.

(5) In the automobile side structure according to any one of the above (1) to (4), an end portion of the first impact absorbing member may have a surface that abuts the second impact absorbing member and/or the door inner panel.

(6) In the automobile side structure according to any one of the above (1) to (5), an end portion on a lower side in the vehicle height direction of the first impact absorbing member may be joined to the door inner panel.

(7) In the automobile side structure according to any one of the above (1) to (6), an end portion on a lower side in the vehicle height direction of the first impact absorbing member may be joined to the second impact absorbing member.

(8) In the automobile side structure according to any one of the above (1) to (7), the automobile side structure may further include a third impact absorbing member that extends in a vehicle length direction inside the automobile door and intersects with the first impact absorbing member.

(9) In the automobile side structure according to the above (8), the third impact absorbing member may be located on a vehicle exterior side in the vehicle width direction with respect to the first impact absorbing member.

(10) In the automobile side structure according to the above (8) or (9), at an intersection portion between the first impact absorbing member and the third impact absorbing member, a thickness in the vehicle width direction of the first impact absorbing member and/or the third impact absorbing member may be reduced.

(11) In the automobile side structure according to any one of the above (8) to (10), the third impact absorbing member may be joined to the first impact absorbing member.

(12) In the automobile side structure according to any one of the above (8) to (11), a plurality of the first impact absorbing members and/or a plurality of the third impact absorbing members may be provided.

(13) In the automobile side structure according to any one of the above (8) to (12), the automobile side structure may further include a pillar, in which the second impact absorbing member may be further disposed between the third impact absorbing member and the door inner panel, and the third impact absorbing member, the second impact absorbing member, the door inner panel, and the pillar may be on a straight line in the vehicle width direction.

(14) In the automobile side structure according to the above (13), the second impact absorbing member disposed between the third impact absorbing member and the door inner panel may be joined to the door inner panel, and the second impact absorbing member and the door inner panel may form a pipe shape having an axis in the vehicle width direction.

(15) In the automobile side structure according to the above (13), the second impact absorbing member disposed between the third impact absorbing member and the door inner panel may be a part of the door inner panel.

(16) According to another aspect of the present invention, there is provided an automobile including the automobile side structure according to any one of the above (1) to (15).

Effects of the Invention

According to the present invention, it is possible to provide an automobile side structure and an automobile, in which it is possible to reliably absorb an impact.

EMBODIMENTS OF THE INVENTION

Figure 1:
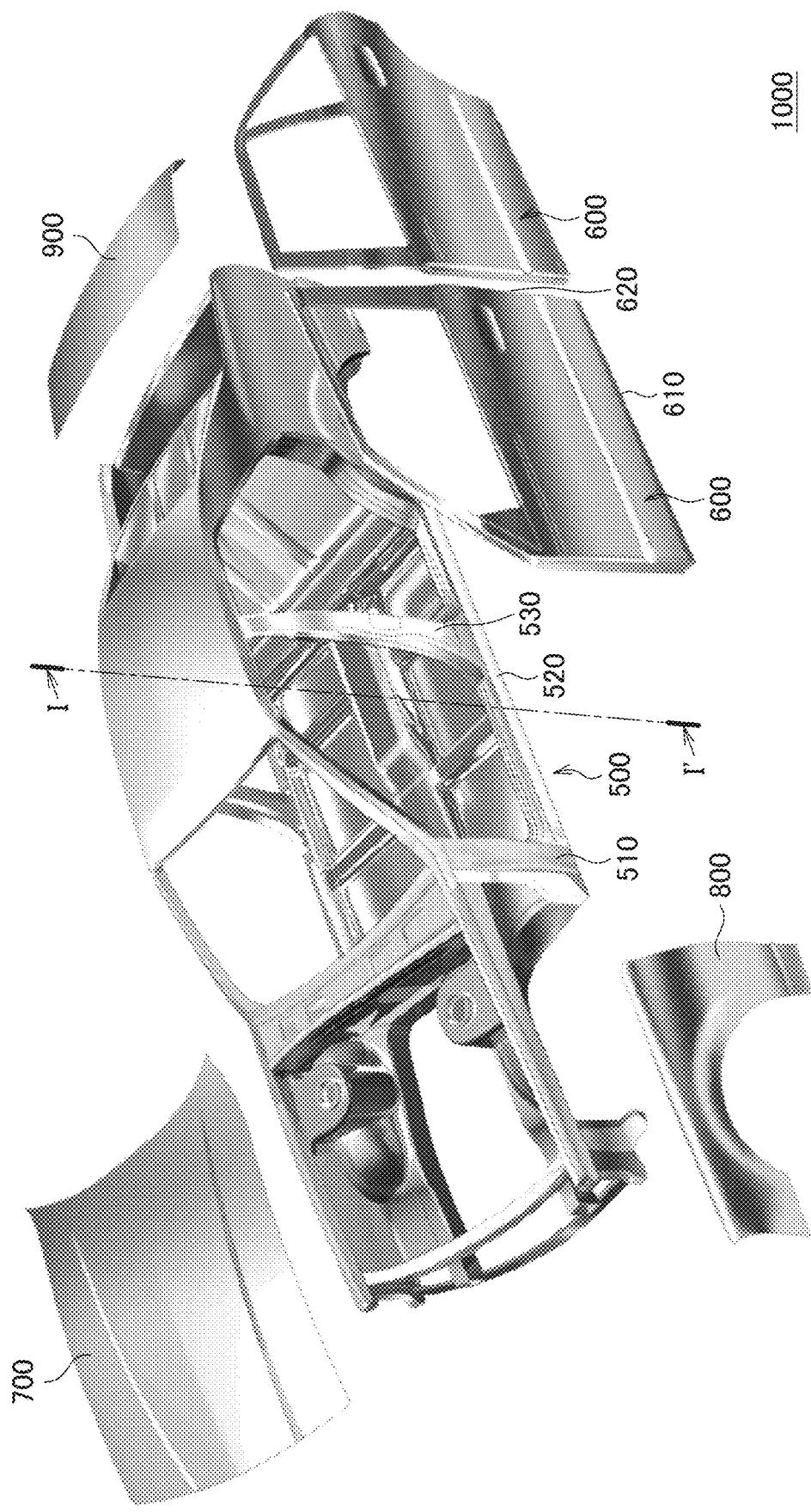
FIG. 1 is a perspective view showing a structure of an automobile according to an embodiment of the present invention.

Hereinafter, a preferred embodiment of the present invention will be described in detail with reference to the accompanying drawings. In this specification and the drawings, constituent elements having substantially the same functional configuration are denoted by the same reference numerals, whereby overlapping description is omitted.

FIG. 1 is a perspective view showing the structure of an automobile 1000 according to an embodiment of the present invention. As shown in FIG. 1, the automobile 1000 is provided with constituent elements such as a body 500, a door 600 (a front door and/or a rear door), a bonnet 700, a fender 800, and a trunk lid 900. In the present embodiment, the automobile 1000, in particular, the structure in the vicinity of the door 600, will be described. The present invention can be applied to not only a door that is mounted to a vehicle body through a hinge but also a sliding door.

Usually, the door 600 and the body 500 are connected such that the door 600 can rotate with respect to the body 500, through a door hinge provided at an A pillar 510 (also referred to as a front pillar) of the body 500 (or a door hinge provided at a B pillar 530).

Figure 2:
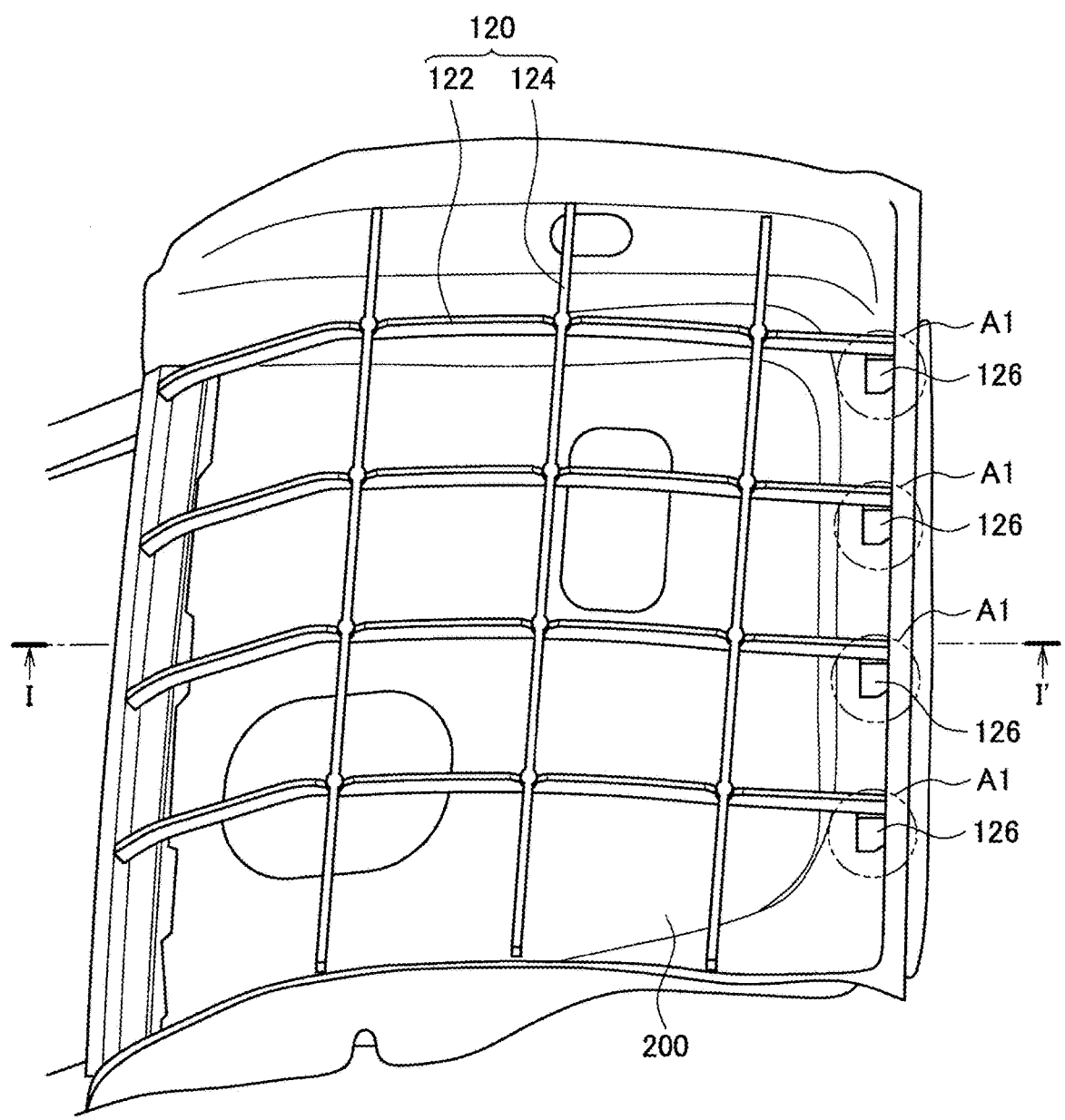
FIG. 2 is a schematic diagram showing a structure of a door according to the present embodiment.
Figure 3:
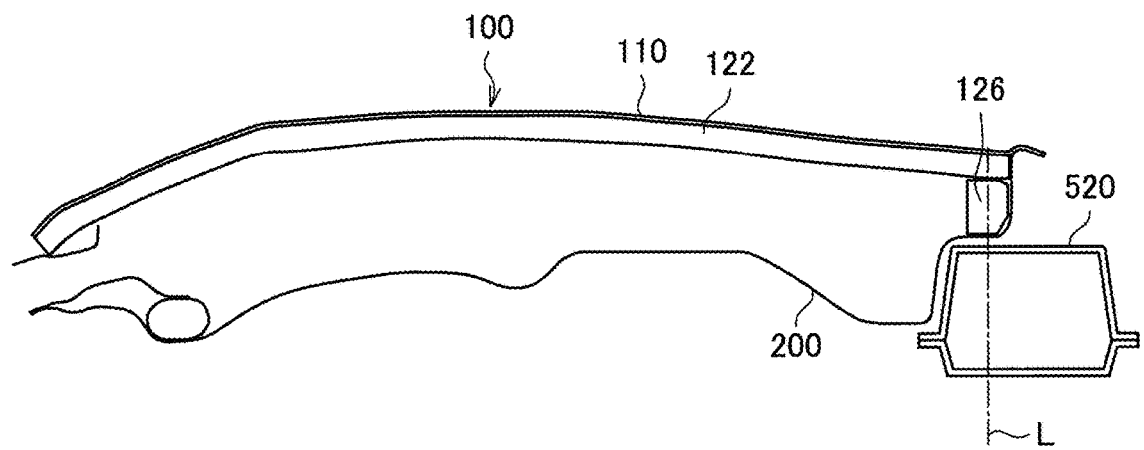
FIG. 3 is a schematic diagram showing a cross section along a one-dot chain line I-I' shown in FIG. 2 in a state where the door according to the present embodiment is closed with respect to a body.

FIG. 2 is a schematic diagram showing the structure of the door 600 and shows a state where the door 600 is viewed from the outside of the automobile 1000. For convenience of description, in FIG. 2, only an impact absorbing member 120 of an exterior panel 100 (described later) is shown, and an exterior material 110 is not shown. Further, FIG. 3 is a schematic diagram showing a cross section along a one-dot chain line I-I' shown in FIG. 2 in a state where the door 600 is closed with respect to the body 500. The position of the one-dot chain line I-I' shown in FIG. 2 corresponds to the position of the one-dot chain line I-I' shown in FIG. 1.

In a case where the door 600 is a door (front door) on the front seat side of the automobile, in a state where it is closed with respect to the body 500, a lower end portion 610 thereof is adjacent to a side sill 520 of the body 500 with a side panel interposed therebetween, and an end portion 620 on the rear side of the door 600 on the front seat side of the automobile is adjacent to the B pillar 530 (also referred to as a center pillar) of the body 500 with a side panel interposed therebetween. The A pillar 510 and the B pillar 530 are also collectively referred to as a pillar.

As shown in FIG. 3, the door 600 is provided with the exterior panel 100. The exterior panel 100 is a panel whose front side is exposed to the outside of the automobile 1000. The surface on the front side of the exterior panel 100 is painted according to the color of the automobile 1000.

The exterior panel 100 includes the exterior material 110 and the impact absorbing member 120. The exterior material 110 is made of a steel sheet having a thickness in a range of about 0.4 to 0.7 mm, as an example. As an example, the exterior material 110 is curved such that the front side thereof is convex. That is, the exterior material 110 is curved in a cross section perpendicular to a vehicle length direction.

As shown in FIG. 2, the impact absorbing member 120 includes a first impact absorbing member 122 disposed in the vehicle height direction and a third impact absorbing member 124 disposed in the vehicle length direction. In the example of FIG. 2, the first impact absorbing member 122 and the third impact absorbing member 124 intersect with each other. Here, the fact that the first impact absorbing member 122 is disposed in the vehicle height direction means that the longitudinal direction of the first impact absorbing member 122 is disposed so as to intersect with the vehicle length direction. Further, the fact that the third impact absorbing member 124 is disposed in the vehicle length direction means that the third impact absorbing member 124 is disposed so as to intersect with the vehicle height direction.

It is desirable that the first impact absorbing member 122 is curved to follow the shape of the exterior material 110. The third impact absorbing member 124 extends substantially linearly. However, in a case where the exterior material 110 is curved in a cross section perpendicular to the vehicle height direction, it is desirable that the third impact absorbing member 124 has a shape following the curved shape of the exterior material 110. This is because, if the first impact absorbing member 122 and the third impact absorbing member 124 have shapes following the shape of the exterior material 110, the first impact absorbing member 122 and the third impact absorbing member 124 can be in close contact with the exterior material 110 and be preferably joined (bonded) to the exterior material 110. If the first impact absorbing member 122 or the third impact absorbing member 124 is joined to the exterior material 110, when the first impact absorbing member 122 or the third impact absorbing member 124 is deformed, the exterior material 110 resists deformation. That is, because the exterior material 110 can contribute to impact absorption, it is more preferable.

Figure 4:
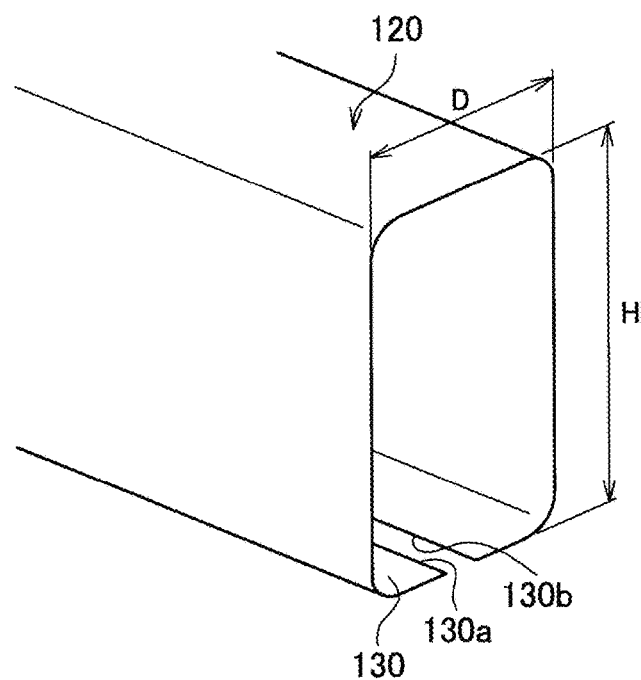
FIG. 4 is a schematic perspective view showing an example of a configuration of an impact absorbing member according to the present embodiment.

FIG. 4 is a perspective view showing an example of the configuration of the impact absorbing member 120. The basic configurations of the first impact absorbing member 122 and the third impact absorbing member 124 can be the same. FIG. 4 also shows a cross-sectional configuration orthogonal to the longitudinal direction of the impact absorbing member 120. In the example shown in FIG. 4, the impact absorbing member 120 has a hollow rectangular (oblong) cross section. The impact absorbing member 120 is manufactured by bending a sheet material 130. Further, the impact absorbing member 120 may be manufactured with a hollow tubular member or a solid rod-shaped member. Further, the impact absorbing member 120 may have a hollow or solid trapezoidal cross section. In the example shown in FIG. 4, the impact absorbing member 120 has an oblong cross-sectional shape, and one side thereof has a long side H in a range of about 6 to 20 mm and a short side D in a range of about 6 to 16 mm. Further, the sheet thickness of the sheet material 130 forming the impact absorbing member 120 is in a range of about 0.6 to 1.2 mm, as an example. As the sheet material 130, a steel sheet can be used. The tensile strength of the first impact absorbing member 122 and the third impact absorbing member 124 is preferably 980 MPa or more, and more preferably 1470 MPa or more. Further, in a case where the first impact absorbing member 122 and the third impact absorbing member 124 are formed from a steel sheet by press forming, cold forming may be used, or hot stamping may be adopted depending on the strength of the steel sheet. In this specification, the "cross section" of the impact absorbing member 120 means a cross section perpendicular to the longitudinal direction of the impact absorbing member 120.

As shown in FIG. 4, a predetermined gap may be provided between an end portion 130a and an end portion 130b of the bent sheet material 130. On the other hand, the end portion 130a and the end portion 130b may be in close contact with each other. Further, the end portion 130a and the end portion 130b may be joined to each other by welding, bonding, or the like. The cross section of the impact absorbing member 120 does not need to have a continuous rectangular shape, annular shape, or trapezoidal shape, and may have a discontinuous shape due to the presence of a gap. Further, in a case where end portions are present in the cross section of the impact absorbing member 120, the end portions may be in close contact with each other, or the end portions may be joined to each other by welding, bonding, or the like.

As shown in FIGS. 2 and 3, a door inner panel 200 is provided inside the exterior panel 100. As an example, the door inner panel 200 is made of a steel sheet. The further inner side of the door inner panel 200 faces the vehicle interior, and is usually provided with an interior material made of leather or a resin material.

Next, the structure of the portion where the lower end portion 610 of the door 600 and the side sill 520 are adjacent to each other will be described. As shown in FIG. 3, the first impact absorbing member 122 extends to the vicinity of the lower end of the door 600. Similarly, the door inner panel 200 also extends to the vicinity of the lower end of the door 600. Therefore, at the portion where the lower end portion 610 of the door 600 and the side sill 520 are adjacent to each other, the first impact absorbing member 122 is interposed between the exterior panel 100 and the side sill 520.

Further, as shown in FIGS. 2 and 3, at the portion where the lower end portion 610 of the door 600 and the side sill 520 are adjacent to each other, a second impact absorbing member 126 is interposed between the exterior panel 100 and the side sill 520. More specifically, at this portion, the second impact absorbing member 126 is interposed between the first impact absorbing member 122 and the side sill 520, and each of a plurality of the second impact absorbing members 126 is provided corresponding to the position of each of the plurality of the first impact absorbing members 122.

Since all of the four first impact absorbing members 122 shown in FIG. 2 extend to the vicinity of the lower end of the door 600, at the portion where the lower end portion 610 of the door 600 and the side sill 520 are adjacent to each other, the four first impact absorbing members 122 are interposed between the exterior panel 100 and the side sill 520. Further, at the portion where the lower end portion 610 of the door 600 and the side sill 520 are adjacent to each other, four second impact absorbing members 126 are interposed between the first impact absorbing member 122 and the side sill 520. In other words, at the lower portion of the door 600, the first impact absorbing member 122 extending in the vehicle height direction, the second impact absorbing member 126, the door inner panel 200, and the side sill 520 are disposed in this order on the same line in the vehicle width direction (a straight line L shown in FIG. 3). According to such a structure, it is possible to significantly improve the impact absorbing performance in a case where another structure (a vehicle, a building, a utility pole, or the like) collides with the side surface of the automobile 1000.

With the configuration in which the first impact absorbing member 122 is interposed between the exterior panel 100 and the side sill 520, the end portion of the first impact absorbing member 122 is supported by the side sill 520. Since the portion (that is, the side sill 520) that supports the first impact absorbing member 122 is a frame member of the automobile 1000 and is not easily deformed, when an impact is applied to the door 600, the first impact absorbing member 122 can receive the load. That is, the impact absorbing performance of the impact absorbing member 120 can be utilized.

Here, from the viewpoint of occupant protection, it is desirable to install the impact absorbing member 120 at a position as far as possible from the occupant. That is, it is preferable to install the impact absorbing member 120 on the exterior material 110 side of the door 600. In this respect, by making the thickness of the door 600 thicker, it is possible to dispose the impact absorbing member 120 closer to the exterior material 110 side. However, in a case where the door 600 is made thicker corresponding to an increase in the thickness of the door 600, when the impact absorbing member 120 is disposed on the exterior material 110 side, the end portion of the first impact absorbing member 122 is separated from the side sill 520. In this case, the first impact absorbing member 122 is separated from the side sill 520, and thus it is assumed that the impact absorbing performance of the first impact absorbing member 122 cannot be utilized.

Therefore, in the present embodiment, as described above, the first impact absorbing member 122, the second impact absorbing member 126, the door inner panel 200, and the side sill 520 are disposed in this order on the same line in the vehicle width direction. Here, the first impact absorbing member 122 is an impact absorbing member extending in the vehicle height direction, and the second impact absorbing member 126 is an impact absorbing member that is disposed between the first impact absorbing member 122 and the door inner panel 200. In other words, the first impact absorbing member 122 and the door inner panel 200 have a structure in which the second impact absorbing member 126 is sandwiched between them. According to such a configuration, when the door 600 is deformed due to a collision from the side surface of the automobile 1000, the first impact absorbing member 122 receives a load and the load is transmitted from the first impact absorbing member 122 to the side sill 520 through the second impact absorbing member 126. That is, the side sill 520 can support the first impact absorbing member 122 to receive the load. In this way, the first impact absorbing member 122, the second impact absorbing member 126, and the side sill 520 can prevent the door 600 provided with the first impact absorbing member 122 from invading toward the vehicle interior side.

The second impact absorbing member 126 is sandwiched between the first impact absorbing member 122 and the side sill 520 with the door inner panel 200 interposed therebetween, and efficiently receives the load. Further, the second impact absorbing member 126 is deformed by itself, thereby being able to absorb the load.

In order to efficiently transmit the load, it is desirable that the cross section of the first impact absorbing member 122 has an annular shape or a rectangular shape as shown in FIG. 4 on the same line described above. This is because if the first impact absorbing member 122 is a flat plate, there is a possibility that it may be broken without almost transmitting the load. That is, if the first impact absorbing member 122 is a flat plate, there is a possibility that the impact absorbing function may not be able to be exhibited in a case of being broken.

Specifically, the absorption of the load (impact energy) due to an impact is performed as follows. First, the collision load is applied to the impact absorbing member 120 at the central portion in the vehicle height direction of the door 600 (step 1). Next, at the lower portion in the vehicle height direction of the door 600, the end portion of the first impact absorbing member 122 is deformed or moved toward the vehicle interior side in the vehicle width direction together with the second impact absorbing member 126 and the door inner panel 200 (step 2). Then, the first impact absorbing member 122 invades toward the vehicle exterior side in the vehicle width direction of the second impact absorbing member 126, the first impact absorbing member 122 is supported by the side sill 520 through the second impact absorbing member 126 and the door inner panel 200, and the first impact absorbing member 122 is deformed to absorb impact energy (step 3). Next, the second impact absorbing member 126 is deformed to further absorb the impact energy (step 4).

More specifically, in step 3, the first impact absorbing member 122 and the second impact absorbing member 126 approach the vehicle exterior side in the vehicle width direction of the side sill 520 with the door inner panel 200 interposed therebetween. If the first impact absorbing member 122, the second impact absorbing member 126, and the side sill 520 are on the same line in the vehicle width direction, step 3 described above does not occur. Further, in a case where the second impact absorbing member 126 is not provided, the absorption of impact energy in step 3 described above does not sufficiently occur and the absorption of impact energy in step 4 described above does not occur. In this manner, according to the configuration of the present embodiment, it is possible to reliably absorb the load due to an impact. Further, by making the cross section of the first impact absorbing member 122 annular or rectangular on the same line, the first impact absorbing member 122 can sufficiently exhibit the impact absorbing function, and the effect of step 3 described above can be further sufficiently exhibited.

In general, a side panel is interposed between the door inner panel 200 and the side sill 520. However, since the contribution of the side panel to impact absorption is small, in the above description, the description regarding the side panel is omitted.

Figure 5:
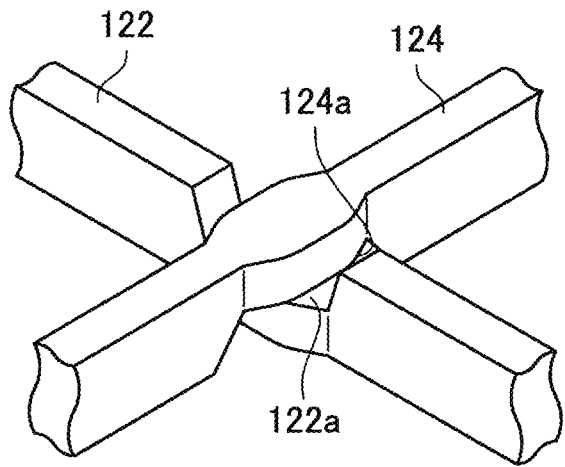
FIG. 5 is a schematic perspective view showing in detail an example of an intersection portion between a first impact absorbing member and a third impact absorbing member according to the present embodiment.

FIG. 5 is a perspective view showing in detail an example of an intersection portion between the first impact absorbing member 122 and the third impact absorbing member 124. FIG. 5 shows a state where the first impact absorbing member 122 and the third impact absorbing member 124 are viewed from the outside (the exterior material 110 side) of the vehicle. At the intersection portion, the third impact absorbing member 124 is located in the direction of the outside (on the exterior material 110 side) of the vehicle with respect to the first impact absorbing member 122. As shown in FIG. 5, the first impact absorbing member 122 may be provided with a recessed part 122a, and the third impact absorbing member 124 may be provided with a recessed part 124a. In other words, at the intersection portion between the first impact absorbing member 122 and the third impact absorbing member 124, the thickness in the vehicle width direction of the first impact absorbing member 122 and/or the third impact absorbing member 124 may be reduced. In this way, the first impact absorbing member 122 and the third impact absorbing member 124 are disposed in the same plane.

The third impact absorbing member 124 is located in the direction of the outside (on the exterior material 110 side) of the vehicle with respect to the first impact absorbing member 122, whereby in a case where another structure collides with the exterior panel 100 of the door 600, a load is transmitted from the exterior material 110 to the third impact absorbing member 124. Then, since the third impact absorbing member 124 is disposed in the vehicle length direction, the load is transmitted from the intersection portion shown in FIG. 5 to a plurality of the first impact absorbing members 122. Then, since the plurality of the first impact absorbing members 122 are disposed in the vehicle height direction and overlap the side sill 520 with the second impact absorbing member 126 interposed therebetween at the lower end portion 610 of the door 600, the load is dispersed to the side sill 520. The side sill 520 is a part of the body 500, which is a frame member of the automobile 1000, and has very high strength. In this way, the load due to a collision can be received by the body 500, and the load is dispersed to the body 500. Therefore, it becomes possible to reliably absorb an impact.

Here, the significance of providing the plurality of the first impact absorbing members 122 will be described in more detail. In a case where only one first impact absorbing member 122 is provided, if an impact is applied to the door 600, an extremely large load is transmitted from the one first impact absorbing member 122 to the side sill 520. That is, it is also assumed that the side sill 520 is damaged. Then, if the side sill 520 is damaged, there is a possibility that the door 600 may invade toward the vehicle interior side. In order to prevent the side sill 520 from being damaged, it is conceivable to further strengthen the side sill 520. However, since the side sill 520 is a part of the body 500 which is a frame member of the automobile 1000, there is a concern that the weight of the automobile 1000 may increase with the strengthening.

As in the present embodiment, it is preferable to dispose the plurality of the first impact absorbing members 122 such that the load is dispersed and transmitted to the side sill 520. In this case, damage to the side sill 520 can be suppressed without specially strengthening the side sill 520. Therefore, the situation where the door 600 invades toward the vehicle interior side can also be more reliably prevented.

Two or more, three or more, or four or more first impact absorbing members 122 may be provided with respect to one exterior panel 100 or one door inner panel 200. For example, in a case where a collision with a structure such as a utility pole is assumed, in order to reliably receive the load even if any portion of the door 600 in the vehicle length direction collides, the number of the first impact absorbing members 122 is preferably three or more, and in order to prevent an increase in weight due to excessive installation of the first impact absorbing members 122, the number of the first impact absorbing members 122 is preferably six or less. More preferably, the number of the first impact absorbing members 122 is four or five.

Two or more, three or more, or four or more third impact absorbing members 124 may be provided with respect to one exterior panel 100 or one door inner panel 200. In order to disperse the load due to a collision by transmitting the load to a wide range above and below in the vehicle height direction of the first impact absorbing member 122, the number of the third impact absorbing members 124 is preferably two or more, and in order to prevent an increase in weight due to excessive installation of the third impact absorbing members 124, the number of the third impact absorbing members 124 is preferably five or less. More preferably, the number of the third impact absorbing members 124 is three or four.

The first impact absorbing member 122 and the third impact absorbing member 124 are in close contact with the exterior material 110, whereby the effect of improving the panel stiffness of the exterior material 110 can also be obtained. The length of one side of the region that is divided by the first impact absorbing member 122 and the third impact absorbing member 124 is preferably 300 mm or less in a case of being viewed along the vehicle width direction in a state where the door is closed with respect to the body, such that good panel stiffness can be obtained even in a case where the thickness of the exterior material 110 is as thin as 0.4 mm, for example, and more preferably, the length of one side of the region that is divided by the first impact absorbing member 122 and the third impact absorbing member 124 is 200 mm or less.

In this manner, in the automobile according to the present embodiment, the load due to a collision is dispersed to the plurality of the first impact absorbing members 122 extending in the vehicle height direction and transmitted to the side sill 520. Therefore, since the load is transmitted to be dispersed in the vehicle length direction of the side sill 520, the load is not locally applied to only a region of a part of the side sill 520. Therefore, it is not necessary to reinforce especially the side sill 520, and it is possible to effectively absorb a load with the normal structure of the body 500.

FIGS. 6A to 6D are schematic diagrams showing variations of a configuration example of the portion where the first impact absorbing member 122 and the second impact absorbing member 126 are adjacent to each other at the lower end portion 610 of the door 600, and show the detailed configuration of a region A1 surrounded by a two-dot chain line in FIG. 2. FIGS. 6A to 6D show a state where the first impact absorbing member 122, the second impact absorbing member 126, and the door inner panel 200 are viewed from the outside (the exterior material 110 side) of the vehicle, and illustration of the exterior material 110 is omitted. As shown in FIGS. 6A to 6D, the lower end of the door inner panel 200 is bent toward the outside (the exterior material 110 side) of the vehicle, so that a hem portion 200a for hemming processing of the exterior material 110 and the door inner panel 200 is configured.

As shown in FIGS. 6A to 6D, the second impact absorbing member 126 is disposed between the first impact absorbing member 122 and the door inner panel 200 and is disposed closer to the door inner panel 200 side than the first impact absorbing member 122. In the examples shown in FIGS. 6A to 6C, the second impact absorbing member 126 is made of an M-shaped sheet metal with flanges in the shape of the cross section perpendicular to the vehicle width direction. Further, the sheet metal configuring the second impact absorbing member 126 extends in the vehicle width direction. The second impact absorbing member 126 can be made of, for example, a steel sheet.

Figure 6A:
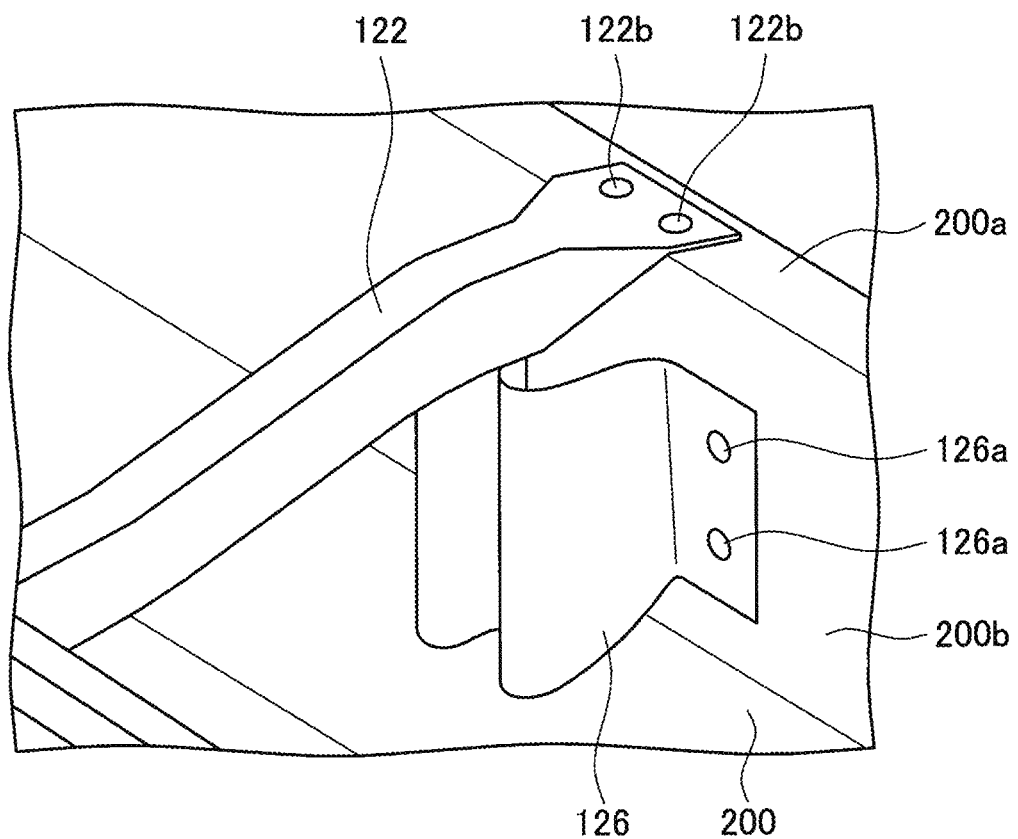
FIG. 6A is a schematic diagram showing a variation of a configuration example of a portion where the first impact absorbing member and a second impact absorbing member are adjacent to each other at a lower end portion of the door according to the present embodiment.
Figure 6B:
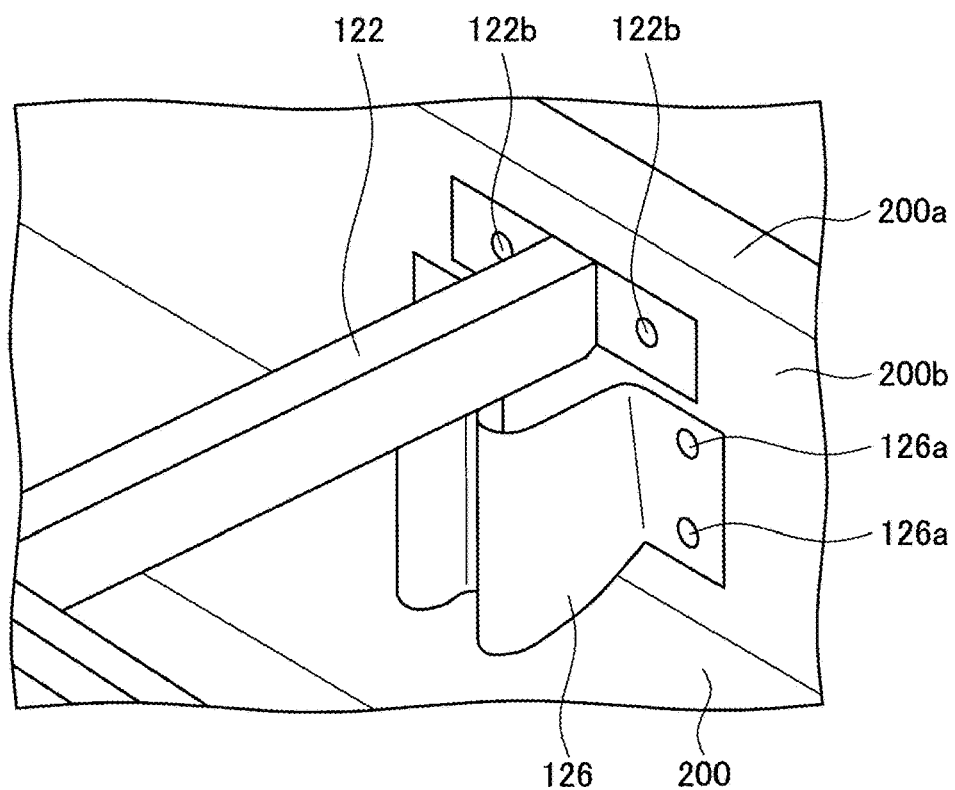
FIG. 6B is a schematic diagram showing a variation of the configuration example of the portion where the first impact absorbing member and the second impact absorbing member are adjacent to each other at the lower end portion of the door according to the present embodiment.
Figure 6C:
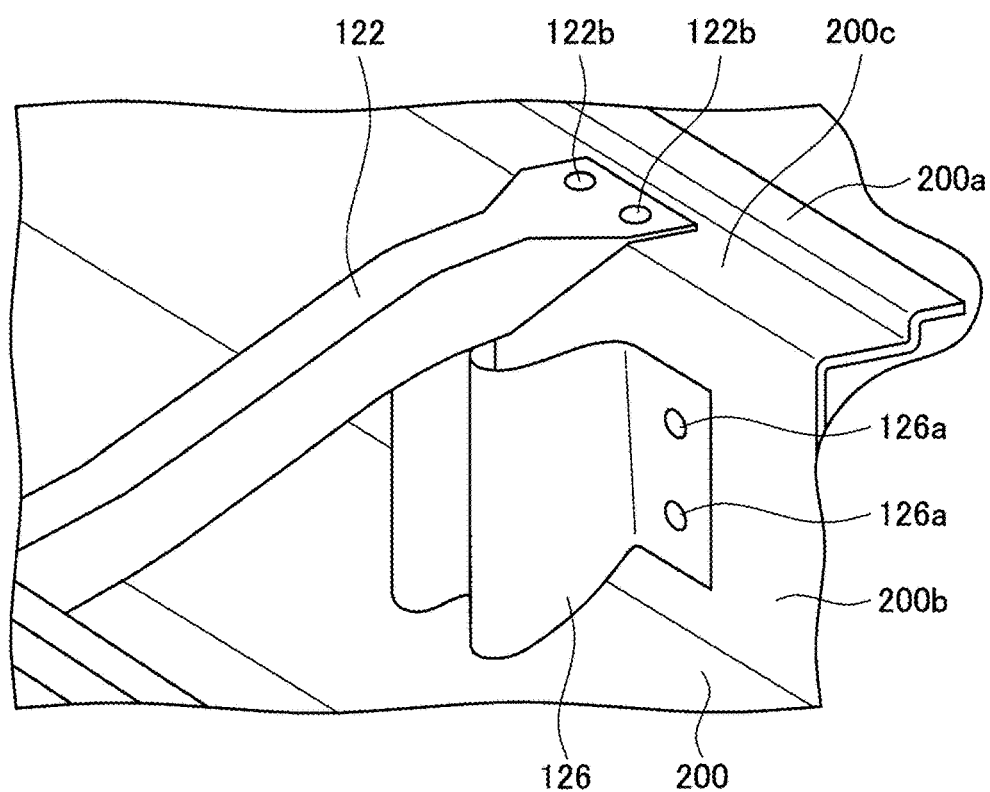
FIG. 6C is a schematic diagram showing a variation of the configuration example of the portion where the first impact absorbing member and the second impact absorbing member are adjacent to each other at the lower end portion of the door according to the present embodiment.

As shown in FIGS. 6A to 6C, the second impact absorbing member 126 is made of a sheet metal having an M-shaped cross-sectional shape, and the extending direction of the sheet metal is the vehicle width direction. With such a configuration, when the side surface of the door 600 receives an impact from the outside, if the first impact absorbing member 122 tries to invade the second impact absorbing member 126, the end portion on the lower side in the vehicle height direction of the first impact absorbing member 122 is first supported by the side sill 520 through the second impact absorbing member 126 and the door inner panel 200. Therefore, the first impact absorbing member can be deformed to absorb the load. Further, the first impact absorbing member 122 invades the second impact absorbing member 126, so that the second impact absorbing member 126 is subjected to buckling deformation and can absorb the load. The cross-sectional shape of the second impact absorbing member 126 is not limited to the M shape, and other shapes may also be adopted.

Further, as shown in FIGS. 6A to 6C, the second impact absorbing member 126 and a bottom portion 200*b* of the door inner panel 200 have an extending direction in the vehicle width direction, and form a pipe shape having an axis in the vehicle width direction. In this way, it is possible to further enhance the effect that the end portion on the lower side in the vehicle height direction of the first impact absorbing member 122 is supported by the side sill 520 through the second impact absorbing member 126 and the door inner panel 200 when the side surface of the door 600 collides. Further, in a case where the first impact absorbing member 122 invades the second impact absorbing member 126, since the second impact absorbing member 126 and the bottom portion 200*b* of the door inner panel 200 are subjected to buckling deformation, it is possible to further enhance the effect of absorbing the load. Here, the pipe shape having an axis in the vehicle width direction means a shape forming a closed cross section when viewed in a cross section perpendicular to the vehicle width direction. Here, the cross-sectional shape does not need to be necessarily continuous when viewed in the entire cross section of the pipe shape, and a closed cross section does not need to be formed at a part of the pipe shape.

It is preferable that a slight amount of gap is provided between the first impact absorbing member 122 and the second impact absorbing member 126 in order to avoid interference due to dimensional error within the tolerance that occurs during manufacturing of each member.

Figure 6D:
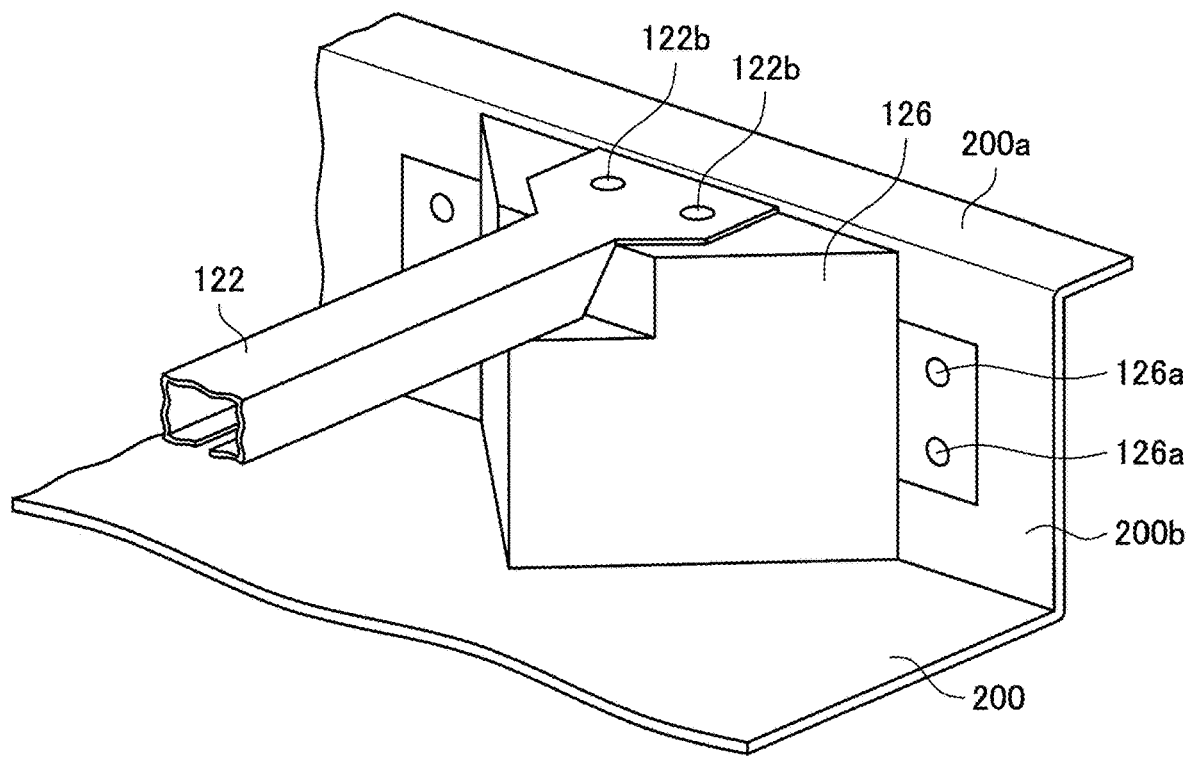
FIG. 6D is a schematic diagram showing a variation of the configuration example of the portion where the first impact absorbing member and the second impact absorbing member are adjacent to each other at the lower end portion of the door according to the present embodiment.

In the example shown in FIG. 6D, the second impact absorbing member 126 is made of a bag-shaped pedestal. The second impact absorbing member 126 shown in FIG. 6D is formed, for example, by pressing a sheet metal. Also in the configuration example shown in FIG. 6D, when the side surface of the door 600 collides, if the first impact absorbing member 122 tries to invade the second impact absorbing member 126, the end portion on the lower side in the vehicle height direction of the first impact absorbing member 122 is first supported by the side sill 520 through the second impact absorbing member 126 and the door inner panel 200. Therefore, the first impact absorbing member 122 can be deformed to absorb the load. Further, the first impact absorbing member 122 invades the second impact absorbing member 126, so that the second impact absorbing member 126 can be deformed to absorb the load.

Further, as shown in FIGS. 6A to 6C, the second impact absorbing member 126 is joined to the bottom portion 200*b* of the door inner panel 200 at a joint portion 126*a*. The second impact absorbing member 126 is joined to the door inner panel 200, whereby when a load is applied to the second impact absorbing member 126, the second impact absorbing member 126 reliably receives the load from the first impact absorbing member 122 without moving from the initial position, and can transport the load to the side sill 520 side. The joining is preferably performed by welding. However, the joining may be performed by a method such as bonding.

Further, in the examples shown in FIGS. 6A to 6C, the first impact absorbing member 122 has a surface that abuts the door inner panel 200 at the end thereof, and is fixed to the door inner panel 200. In the example shown in FIG. 6A, the end of the first impact absorbing member 122 is joined to the hem portion 200*a* at a joint portion 122*b*. On the other hand, in the example shown in FIG. 6B, the end of the first impact absorbing member 122 is joined to the bottom portion 200*b* of the door inner panel 200 at the joint portion 122*b*.

In the example shown in FIG. 6A, since the hem portion 200*a* of the door inner panel 200 is a portion on which the hemming processing is performed to be brought into close contact with the exterior material 110, the shape of the end portion on the lower side of the first impact absorbing member 122 is transferred to the vehicle exterior side of the exterior material 110, and thus there is a possibility that the design may be impaired. As countermeasures against this, for example, a recessed part corresponding to the shape of the end portion on the lower side of the first impact absorbing member 122 may be provided in the hem portion 200*a* such that the surface on the vehicle exterior side of the end portion on the lower side of the first impact absorbing member 122 is flush with the hem portion 200*a*. Further, as a modification example of the example shown in FIG. 6A, as shown in FIG. 6C, another step shape is provided between the hem portion 200*a* and the bottom portion 200*b*, and the end of the first impact absorbing member 122 may be joined to a step surface 200*c* thereof. The joining is preferably performed by welding. However, the joining may be performed by a method such as bonding using a structural adhesive or the like. Further, in the examples shown in FIGS. 6A to 6D, the end of the first impact absorbing member 122 and the door inner panel 200 or the second impact absorbing member 126 are directly fixed to each other. However, the end of the first impact absorbing member 122 may be fixed to the door inner panel 200 or the second impact absorbing member 126 through another component such as a bracket. This is because, although the number of components is increased by using another component such as a bracket, there is an advantage that the shape of the end of the first impact absorbing member 122 can be simplified.

Further, in the example shown in FIG. 6D, the first impact absorbing member 122 has a surface that abuts the second impact absorbing member 126 at the end thereof, and is joined to the second impact absorbing member 126 at the joint portion 122*b*. As shown in FIG. 6D, instead of joining the end of the first impact absorbing member 122 to the door inner panel 200, the end of the first impact absorbing member 122 may be joined to the second impact absorbing member 126. Since the second impact absorbing member 126 is joined to the bottom portion 200*b* of the door inner panel 200 at the joint portion 126*a*, in a case where the end of the first impact absorbing member 122 is joined to the second impact absorbing member 126, the same effect as in a case where the end of the first impact absorbing member 122 is connected to the door inner panel 200 can be obtained.

As shown in FIGS. 6A to 6D, in a state where the first impact absorbing member 122 is joined to the door inner panel 200 or the second impact absorbing member 126, the exterior material 110 is further joined to the hem portion 200*a* of the door inner panel 200 by the hemming processing. The joining of the exterior material 110 and the door inner panel 200 may be performed by bonding or the like, in addition to the hemming processing.

If a load is applied to the first impact absorbing member 122 that is curved to be convex toward the vehicle exterior side in the vehicle width direction, a force to move the end of the first impact absorbing member 122 toward the outside in the vehicle height direction of the door 600 (toward downward) is generated. The first impact absorbing member 122 is joined to the door inner panel 200 or the second impact absorbing member 126, so that the end of the first impact absorbing member 122 can be prevented from moving toward the outside in the vehicle height direction of the door 600. Further, the end of the first impact absorbing member 122 may be disposed at the lower end in the vehicle height direction of the door 600. Then, the end of the first impact absorbing member 122 interferes with the bottom portion 200b of the door inner panel 200, and as a result, the end of the first impact absorbing member 122 can be prevented from moving toward the outside in the vehicle height direction of the door 600. In this way, since the first impact absorbing member 122 can be gradually deformed while maintaining the convexly curved state for a longer period of time and receive a load, the impact absorbing performance is improved.

It is more preferable that the maximum width in the vehicle length direction of the pipe shape formed by the second impact absorbing member 126 and the bottom portion 200b of the door inner panel 200 is larger than the width in the vehicle length direction of the first impact absorbing member 122 in the region where the first impact absorbing member 122 and the second impact absorbing member 126 overlap, in a case of being viewed along the vehicle width direction (when viewed in a plan view perpendicular to the vehicle width direction). In this way, there is an effect that the first impact absorbing member 122 can be restrained from collapsing in the vehicle length direction when a load due to an impact is applied.

Figure 7A:
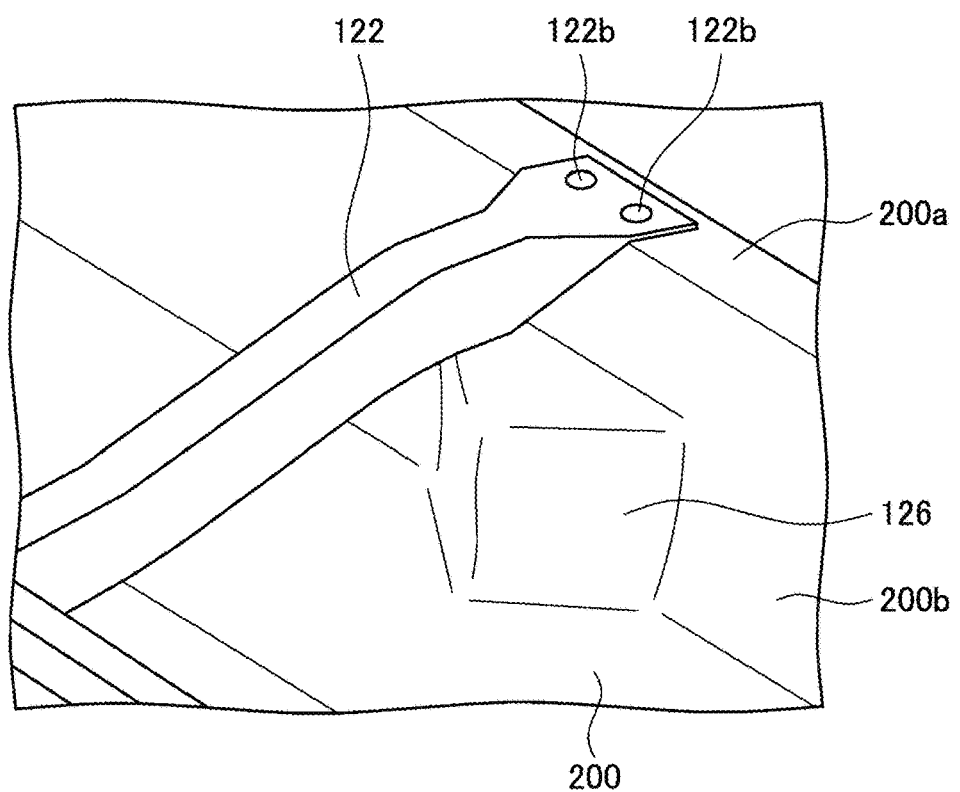
FIG. 7A is a schematic diagram showing an example in which the second impact absorbing member is configured integrally with a door inner panel according to the present embodiment.
Figure 7B:
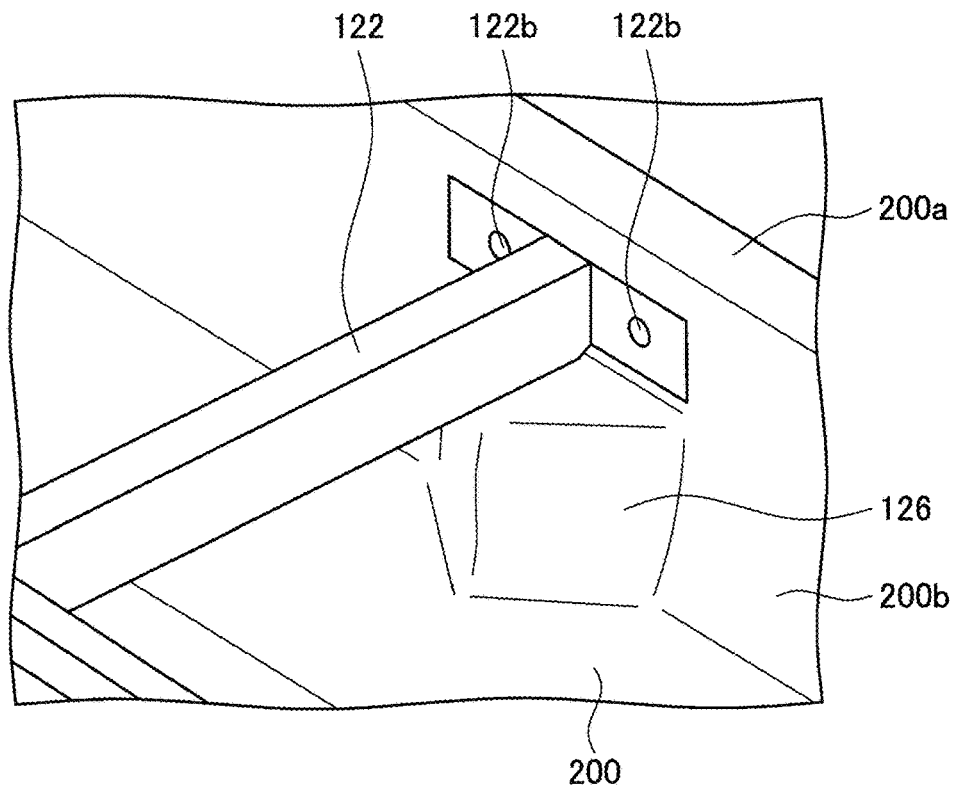
FIG. 7B is a schematic diagram showing an example in which the second impact absorbing member is configured integrally with the door inner panel according to the present embodiment.
Figure 7C:
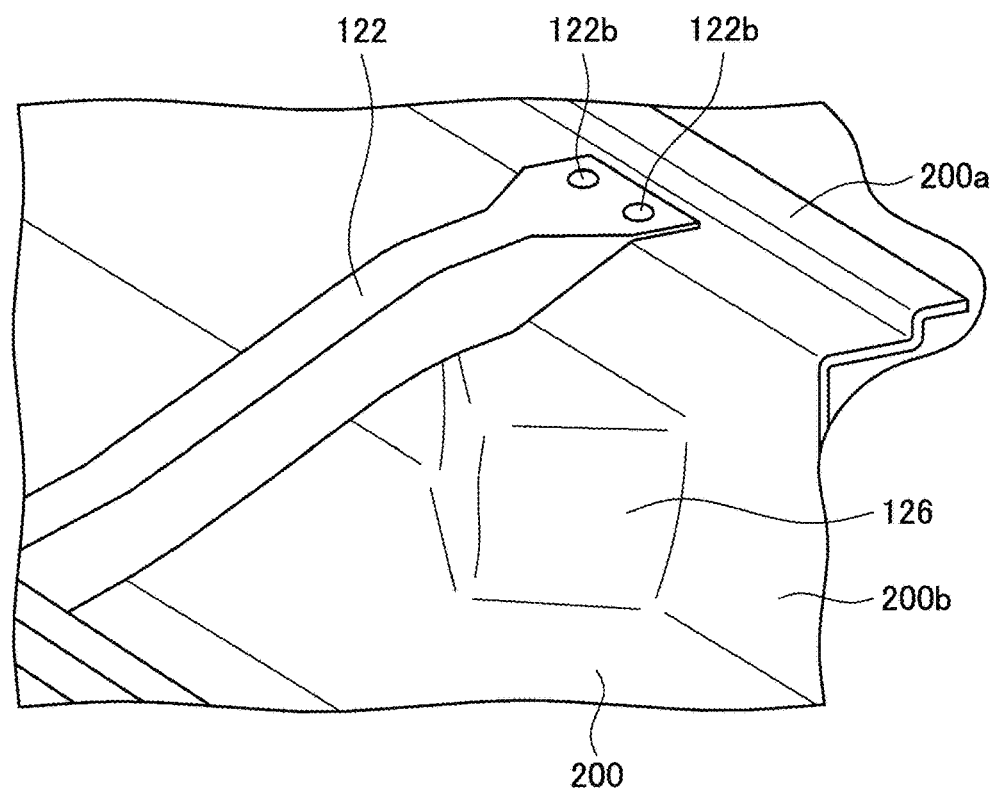
FIG. 7C is a schematic diagram showing an example in which the second impact absorbing member is configured integrally with the door inner panel according to the present embodiment.

Next, examples in which the second impact absorbing member 126 is configured integrally with the door inner panel 200 will be described with reference to FIGS. 7A to 7C. FIGS. 7A to 7C are schematic diagrams showing the vicinity of the end of the first impact absorbing member 122 at the lower end portion 610 of the door 600, and show the detailed configuration of the region A1 surrounded by the two-dot chain line in FIG. 2, similar to FIGS. 6A to 6D. Similar to FIGS. 6A to 6D, FIGS. 7A to 7C show a state where the first impact absorbing member 122, the second impact absorbing member 126, and the door inner panel 200 are viewed from the outside (the exterior material 110 side) of the vehicle, and illustration of the exterior material 110 is omitted.

In the examples shown in FIGS. 7A to 7C, the second impact absorbing member 126 is formed by press-forming the door inner panel 200 into a pedestal shape. In other words, in the examples shown in FIGS. 7A to 7C, the second impact absorbing member 126 is regarded as a part of the door inner panel 200. In this manner, even in a case where the second impact absorbing member 126 is configured from a part of the door inner panel 200, if the first impact absorbing member 122 tries to invade the second impact absorbing member 126 when the side surface of the door 600 collides, the end portion on the lower side in the vehicle height direction the first impact absorbing member 122 is first supported by the side sill 520 through the second impact absorbing member 126 and the door inner panel 200. Therefore, the first impact absorbing member 122 can be deformed to absorb the load. Further, the first impact absorbing member 122 invades the second impact absorbing member 126, so that the second impact absorbing member 126 can be deformed to absorb the load. Further, the second impact absorbing member 126 is formed by processing the door inner panel 200, so that the number of components can be reduced and a process of joining the second impact absorbing member 126 to the door inner panel 200 can be reduced.

Also in the examples shown in FIGS. 7A to 7C, the first impact absorbing member 122 has a surface that abuts the door inner panel 200 at the end thereof, and is fixed to the door inner panel 200. In FIGS. 7A to 7C, the method of joining the first impact absorbing member 122 to the door inner panel 200 is the same as in each of FIGS. 6A to 6C. Further, although not shown in the drawings, in the configurations shown in FIGS. 7A to 7C, the end of the first impact absorbing member 122 may be joined to the second impact absorbing member 126, similar to FIG. 6D.

In the examples shown in FIGS. 7A to 7C, it is more preferable that the maximum width in the vehicle length direction of the second impact absorbing member 126 is larger than the width in the vehicle length direction of the first impact absorbing member 122 in the region where the first impact absorbing member 122 and the second impact absorbing member 126 overlap, in a case of being viewed along the vehicle width direction. In this way, there is an effect that the first impact absorbing member 122 can be restrained from collapsing in the vehicle length direction when a load due to an impact is applied.

Figure 8:
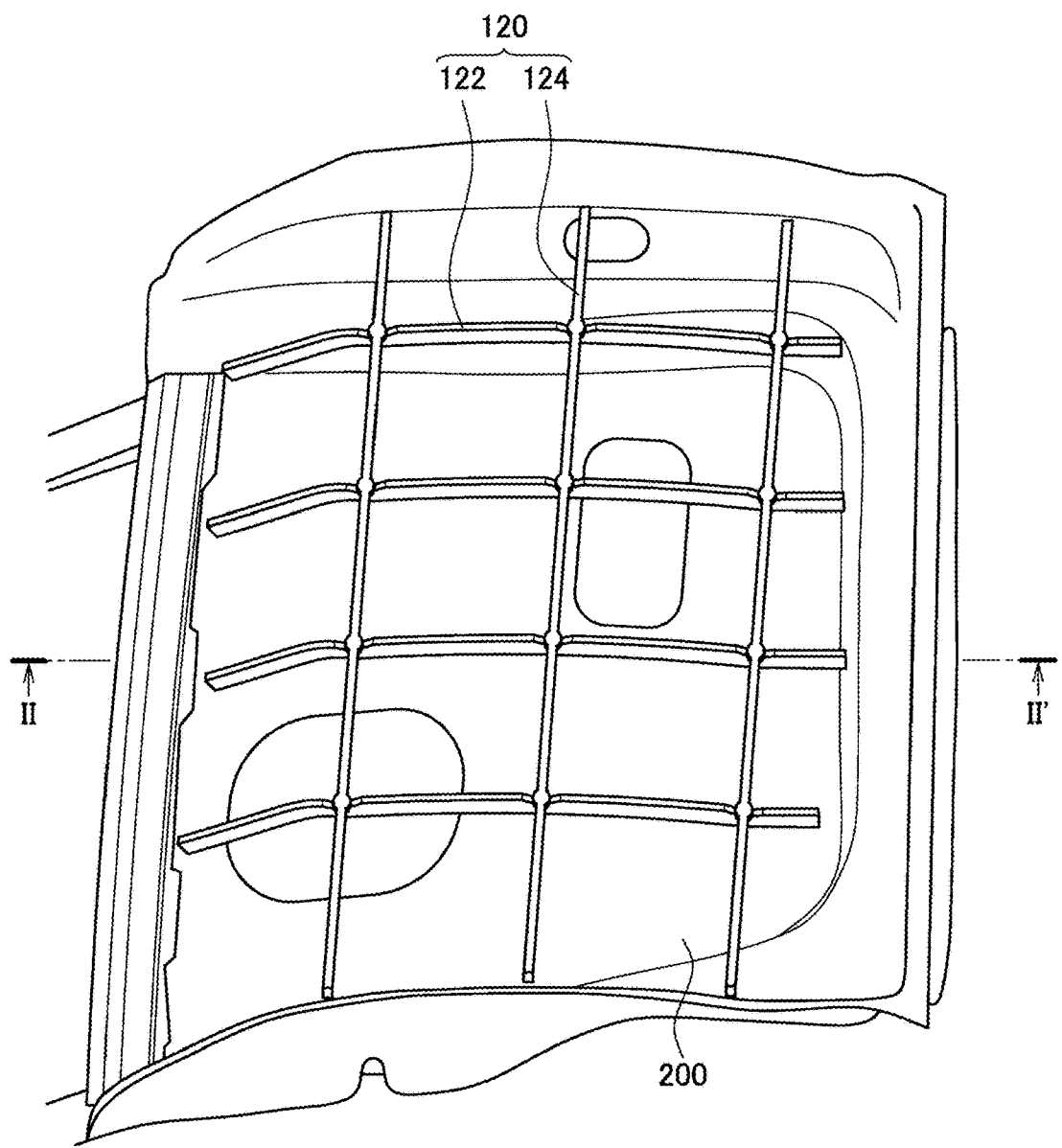
FIG. 8 is a schematic diagram showing a structure of a door according to Comparative Example 1.
Figure 9:
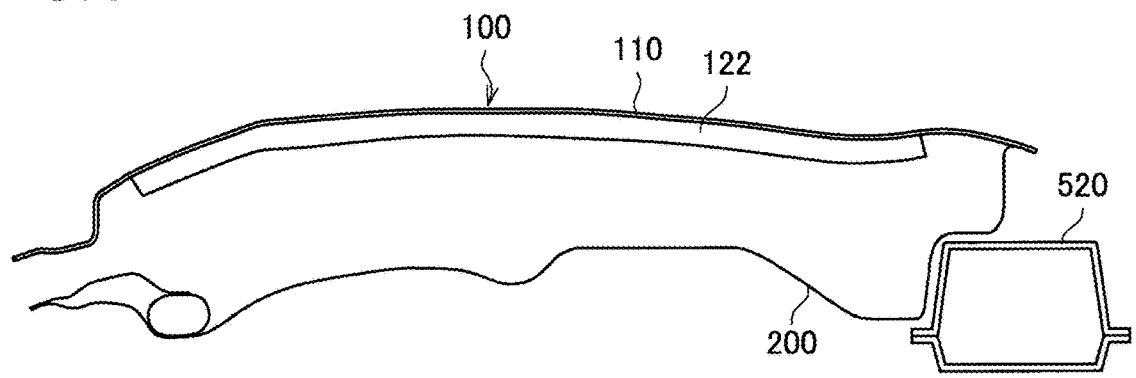
FIG. 9 is a schematic diagram showing a cross section along a one-dot chain line II-II' shown in FIG. 8 in a state where the door is closed with respect to the body.

Further, from the viewpoint of restraining the first impact absorbing member 122 from collapsing in the vehicle length direction when a load due to an impact is applied, it is more preferable to have a portion in which the entirety of the first impact absorbing member 122 is included within the pipe shape formed by the second impact absorbing member 126 and the bottom portion 200b of the door inner panel 200 or within the second impact absorbing member 126 in the vehicle length direction in the region where the first impact absorbing member 122 and the second impact absorbing member 126 overlap, in a case of being viewed along the vehicle width direction, Next, Comparative Examples 1 and 2 with respect to the above embodiment of the present invention will be described with reference to FIGS. 8 to 11. FIG. 8 is a schematic diagram showing the structure of the door 600 according to Comparative Example 1, and shows a state where the door 600 is viewed from the outside of the automobile 1000, similar to FIG. 2. Further, FIG. 9 is a schematic diagram showing a cross section along a one-dot chain line II-II' shown in FIG. 8 in a state where the door 600 is closed with respect to the body 500. The position of the one-dot chain line I-I' shown in FIG. 8 corresponds to the position of the one-dot chain line I-I' shown in FIG. 1.

As shown in FIGS. 8 and 9, in the configuration of Comparative Example 1, the first impact absorbing member 122 does not extend to the position of the side sill 520 in the vehicle height direction. Therefore, in a case where another structure collides with the exterior panel 100 of the door 600, the load cannot be effectively received by the side sill 520.

Figure 10:
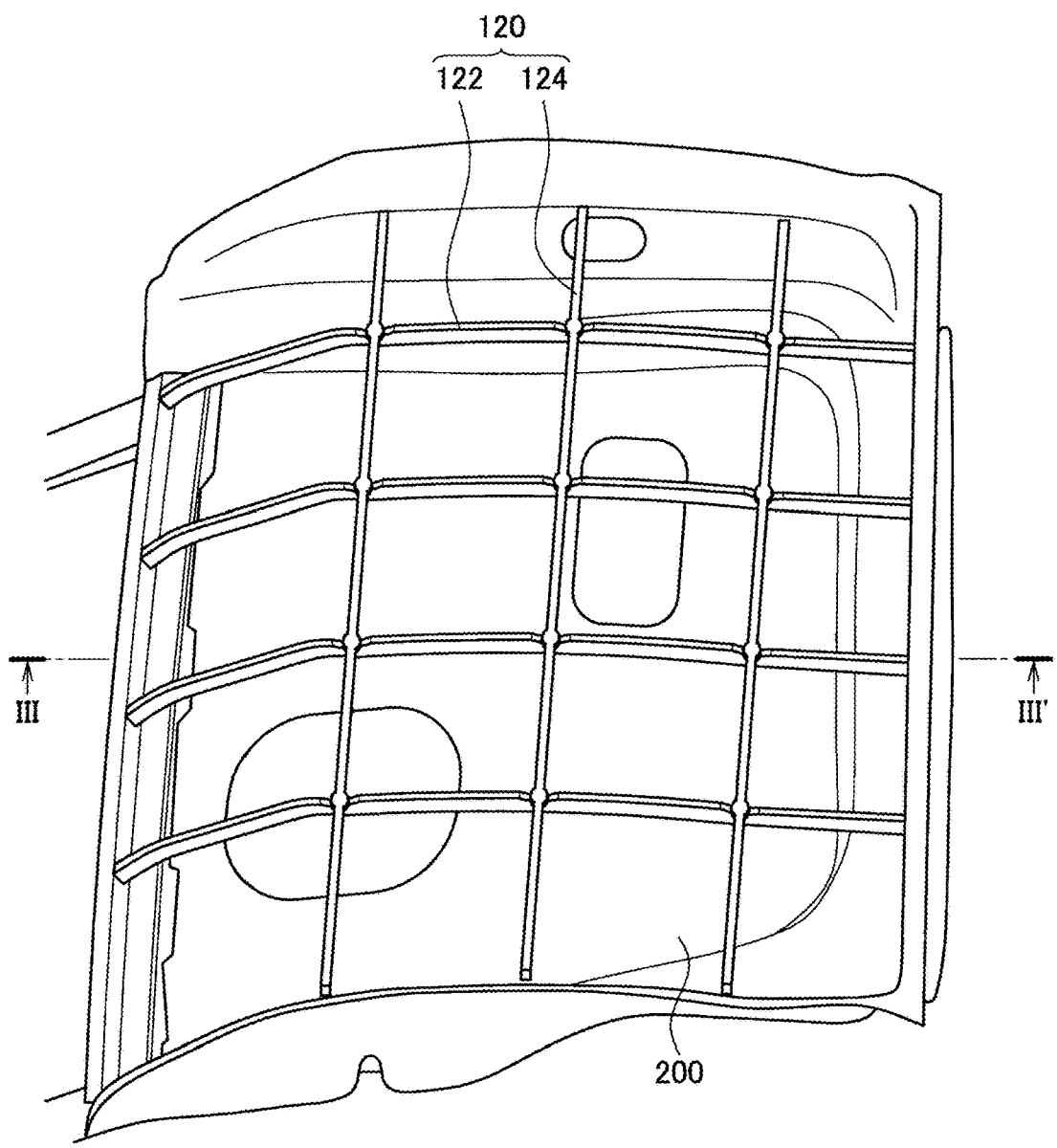
FIG. 10 is a schematic diagram showing a structure of a door according to Comparative Example 2.

Further, FIG. 10 is a schematic diagram showing the structure of the door 600 according to Comparative Example 2, and shows a state where the door 600 is viewed from the outside of the automobile 1000, similar to FIG. 2. Further, FIG. 11 is a schematic diagram showing a cross section along a one-dot chain line III-III' shown in FIG. 10 in a state where the door 600 is closed with respect to the body 500.

The position of the one-dot chain line III-III' shown in FIG. 10 corresponds to the position of the one-dot chain line I-I' shown in FIG. 1.

Figure 11:
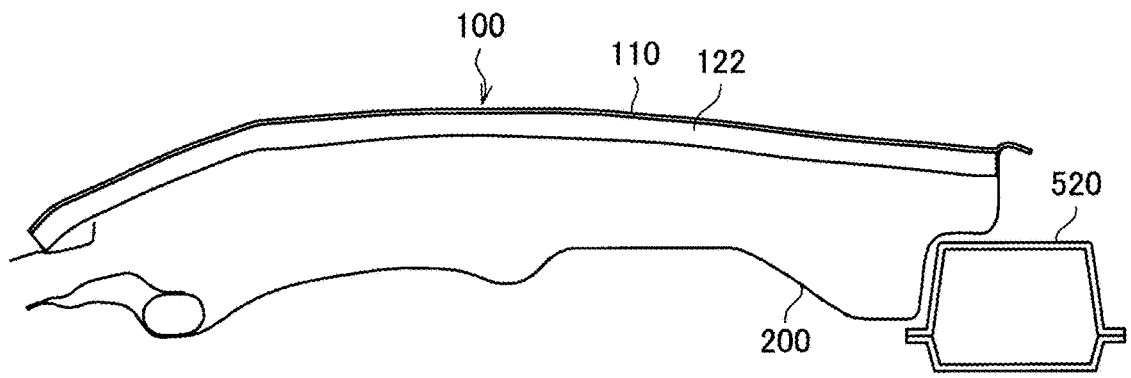
FIG. 11 is a schematic diagram showing a cross section along a one-dot chain line III-III' shown in FIG. 10 in a state where the door is closed with respect to the body.

As shown in FIGS. 10 and 11, in the configuration of Comparative Example 2, although the first impact absorbing member 122 extends to the position of the side sill 520, the second impact absorbing member 126 in the present embodiment is not provided. Therefore, at the position of the side sill 520, a space is created between the first impact absorbing member 122 and the door inner panel 200, and thus in a case where another structure collides with the exterior panel 100 of the door 600, a load cannot be effectively received by the side sill 520.

Figure 12:
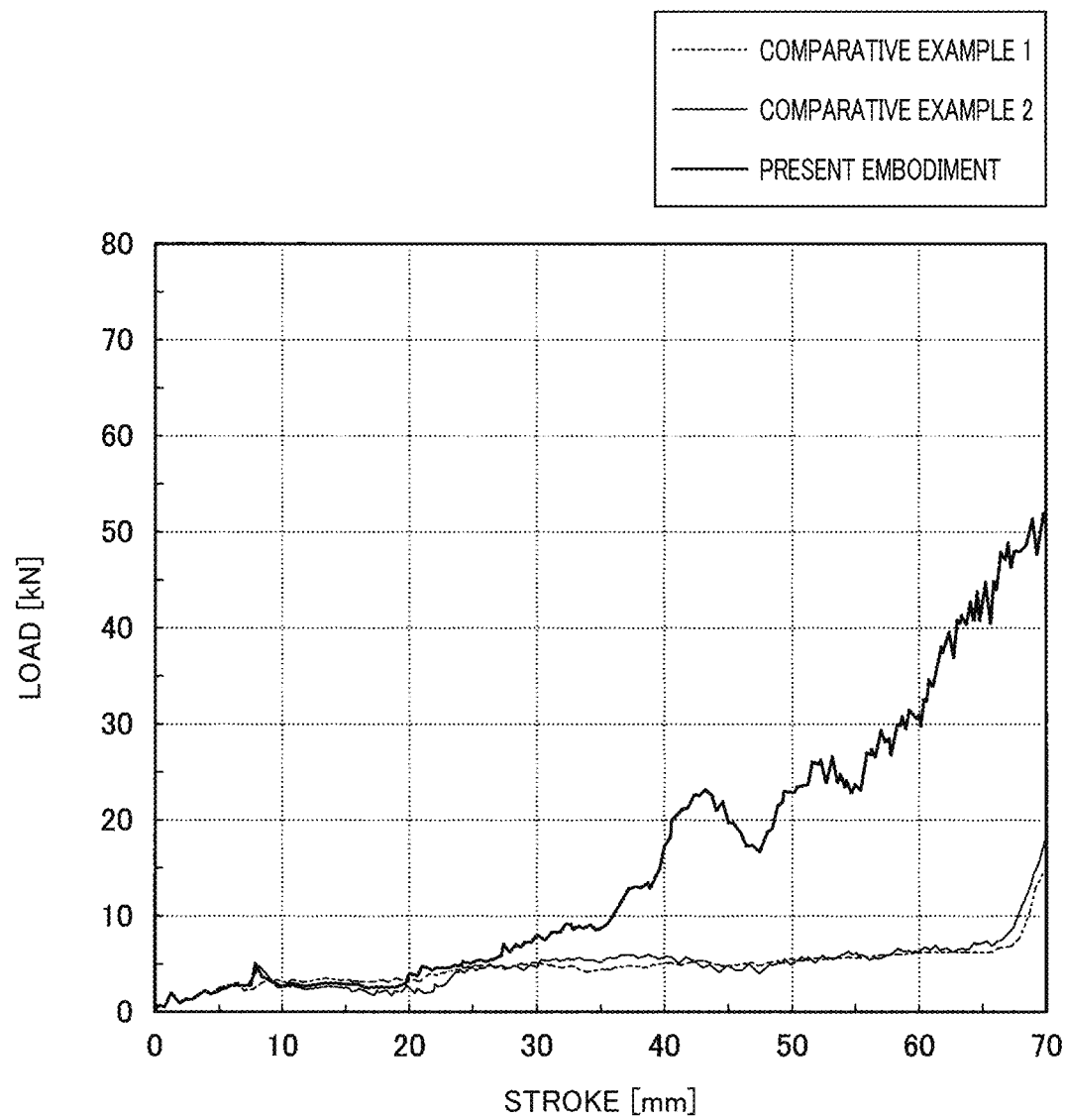
FIG. 12 is a characteristic diagram showing the relationship between a stroke of an indenter and a load that the indenter receives, in a case where an exterior panel of a door is pushed by the indenter, with respect to the configuration of the present embodiment shown in FIG. 2 and the configurations of Comparative Examples 1 and 2.

FIG. 12 is a characteristic diagram in which in a case where the center of the exterior panel 100 of the door 600 is pushed by a columnar indenter having a radius of 300 mm and an axis in the vehicle height direction, the relationship between the stroke of the indenter and a load that the indenter receives from the door 600 is obtained by simulation, with respect to the configuration of the embodiment of the present invention shown in FIG. 2 and the configurations of Comparative Examples 1 and 2 described above. As shown in FIG. 12, in the case of the same stroke, the load characteristic is further improved in the present embodiment than in Comparative Examples 1 and 2, and the difference is remarkable when the stroke is 25 mm or more. Therefore, it can be understood that the impact absorbing performance can be greatly improved by the configuration of the present embodiment.

In the above description, the case is an exemplary example where each of the members such as the first impact absorbing member 122, the second impact absorbing member 126, the third impact absorbing member 124, and the door inner panel 200 is made of a steel sheet. However, these members may be made of other materials such as aluminum, an aluminum alloy, and CFRP (carbon fiber reinforced plastic).

As described above, according to the present embodiment, at the lower portion of the door 600, the first impact absorbing member 122 extending in the vehicle height direction, the second impact absorbing member 126, the door inner panel 200, and the side sill 520 are disposed in this order on the same line in the vehicle width direction. Therefore, the impact absorbing performance in a case where the side surface of the automobile 1000 collides with another structure can be greatly improved.

In the present invention, the automobile side structure includes structural members such as an automobile door, a side sill, and a pillar.

The preferred embodiment of the present invention has been described in detail above with reference to the accompanying drawings. However, the present invention is not limited to such an example. It is clear that by a person having ordinary knowledge in the field of the technique to which the present invention belongs, various change examples or modification examples can be conceived within the scope of the technical idea of the present invention and it will be understood that these examples also naturally belong to the technical scope of the present invention.

The present invention can be applied to the front door or the rear door of an automobile. Further, the present invention can be applied to not only a door that is disposed at a side portion of an automobile but also a door (also referred to as a tailgate) that is disposed at a rear portion of an automobile. In a case where the present invention is applied to a door that is disposed at a rear portion of an automobile, an inner panel of such a door intersects with the vehicle length direction of the automobile. Therefore, the vehicle length direction described in the above embodiment may be read as a vehicle width direction and the vehicle width direction may be read as a vehicle length direction.

INDUSTRIAL APPLICABILITY

The present invention has high industrial applicability because it is possible to provide an automobile side structure and an automobile, in which it is possible to reliably absorb an impact.

BRIEF DESCRIPTION OF THE REFERENCE SYMBOLS

122: first impact absorbing member
124: third impact absorbing member
126: second impact absorbing member
200: door inner panel
520: side sill
600: door
1000: automobile

What is claimed is:

1. An automobile side structure comprising:
a first impact absorbing member extending in a vehicle height direction inside an automobile door;
a second impact absorbing member inside the automobile door;
a door inner panel inside the automobile door; and
a side sill,
wherein the first impact absorbing member, the second impact absorbing member, the door inner panel, and the side sill are on a straight line in a vehicle width direction, and
the second impact absorbing member is disposed between the first impact absorbing member and the door inner panel, and wherein
the second impact absorbing member is joined to the door inner panel, and
the second impact absorbing member and the door inner panel form a pipe shape having an axis in the vehicle width direction.

2. The automobile side structure according to claim 1, wherein a cross section of the first impact absorbing member on the straight line is rectangular or annular.

3. The automobile side structure according to claim 1, wherein the second impact absorbing member is a part of the door inner panel.

4. The automobile side structure according to claim 1, wherein an end portion of the first impact absorbing member has a surface that abuts the second impact absorbing member and/or the door inner panel.

5. The automobile side structure according to claim 1, wherein an end portion on a lower side in the vehicle height direction of the first impact absorbing member is joined to the door inner panel.

6. The automobile side structure according to claim 1, wherein an end portion on a lower side in the vehicle height direction of the first impact absorbing member is joined to the second impact absorbing member.

7. The automobile side structure according to claim 1, further comprising:
a third impact absorbing member that extends in a vehicle length direction inside the automobile door and intersects with the first impact absorbing member.

8. The automobile side structure according to claim 7, wherein the third impact absorbing member is located on a vehicle exterior side in the vehicle width direction with respect to the first impact absorbing member.

9. The automobile side structure according to claim 7, wherein at an intersection portion between the first impact absorbing member and the third impact absorbing member, a thickness in the vehicle width direction of the first impact absorbing member and/or the third impact absorbing member is reduced.

10. The automobile side structure according to claim 7, wherein the third impact absorbing member is joined to the first impact absorbing member.

11. The automobile side structure according to claim 7, wherein a plurality of the first impact absorbing members and/or a plurality of the third impact absorbing members are provided.

12. The automobile side structure according to claim 7, further comprising:
a pillar,
wherein the second impact absorbing member is further disposed between the third impact absorbing member and the door inner panel, and
the third impact absorbing member, the second impact absorbing member, the door inner panel, and the pillar are on a straight line in the vehicle width direction.

13. The automobile side structure according to claim 12, wherein
the second impact absorbing member disposed between the third impact absorbing member and the door inner panel is joined to the door inner panel; and
the second impact absorbing member and the door inner panel form a pipe shape having an axis in the vehicle width direction.

14. The automobile side structure according to claim 12, wherein the second impact absorbing member disposed between the third impact absorbing member and the door inner panel is a part of the door inner panel.

15. An automobile comprising:
the automobile side structure according to claim 1.

* * * * *